United States Patent
Kalyan et al.

(10) Patent No.: US 8,005,908 B2
(45) Date of Patent: Aug. 23, 2011

(54) SYSTEM FOR DETECTING INFORMATION LEAKAGE IN OUTBOUND E-MAILS WITHOUT USING THE CONTENT OF THE MAIL

(75) Inventors: Malathi Kalyan, Bangalore (IN); Abhi Dattasharma, West Bengal (IN); Ram Lokendar Singh, Bangalore (IN)

(73) Assignee: Saraansh Software Solutions PVt. Ltd., Bangalore (IN)

( * ) Notice: Subject to any disclaimer, the term of this patent is extended or adjusted under 35 U.S.C. 154(b) by 103 days.

(21) Appl. No.: 12/400,180

(22) Filed: Mar. 9, 2009

(65) Prior Publication Data

US 2009/0228565 A1    Sep. 10, 2009

(30) Foreign Application Priority Data

Mar. 10, 2008    (IN) .............................. 489/KOL/2008

(51) Int. Cl.
    *G06F 15/16* (2006.01)
(52) U.S. Cl. ...................................................... 709/206
(58) Field of Classification Search .................. 709/206
    See application file for complete search history.

(56) References Cited

U.S. PATENT DOCUMENTS

2004/0083389 A1* 4/2004 Yoshida ........................ 713/201
2009/0241197 A1* 9/2009 Troyansky ...................... 726/26

OTHER PUBLICATIONS

Gloor, P. Niepel, S, Li, Y.; "Identifying Potential Suspects by Temporal Link Analysis." MIT CCS and iQuest Analytics; Jan. 2006.

* cited by examiner

*Primary Examiner* — Phuoc Nguyen
*Assistant Examiner* — Steven C Nguyen
(74) *Attorney, Agent, or Firm* — Venable LLP; Jeffri A. Kaminski; Christopher Ma

(57) ABSTRACT

A system for detecting information leakage in e-mails using neural network and support vector machines is provided. This system does not use the content of the e-mail or the content of the attachments in the e-mail. Instead, a set of non-sensitive variables or attributes is picked from the e-mails originating from a given establishment and also from the profiles of the users sending those mails. The said attributes are extracted for all outbound mails. This extraction process does not involve reading the main text of the mail and thus the sensitivity of the mail information is protected. These attributes are chosen using filters built into the detection hardware. Neural networks and support vector machine built into the detection hardware are then used on these attributes to detect pattern violation and possible information leakage.

3 Claims, 8 Drawing Sheets

SYSTEM FOR DETECTING INFORMATION LEAKAGE IN OUTBOUND E-MAILS WITHOUT USING THE CONTENT OF THE MAIL

FIELD OF INVENTION

The present invention pertains to the field of information leakage detection and electronic mail security. More particularly, the present invention relates to a system for extraction of non-sensitive attributes from sender profiles and outbound e-mails and information leakage detection in same e-mails using the extracted attributes applying neural network and support vector machine when full mail text is not available.

BACKGROUND OF THE INVENTION

U.S. Pat. No. 7,124,438, "Systems and methods for anomaly detection in patterns of monitored communications", Paul Judge et al, Issue date: Oct. 17, 2006.

U.S. Pat. No. 6,507,866, "E-mail usage pattern detection", Ronald Barchi, Issue date: Jan. 14, 2003.

U.S. Pat. No. 6,735,701, "Network policy management and effectiveness system", Andrea M. Jacobson, Issue date: May 11, 2004.

U.S. Pat. No. 7,315,891 B2, "Employee Internet Management Device", Thomas P Donahue, Publication date: Jan. 1, 2008.

U.S. patent application Ser. No. 11/429928, "Methods and Systems for reporting Regions of Interest in Content Files", Palle M. Pedersen, Publication date: Nov. 8, 2007.

U.S. patent application Ser. No. 11/347463, "Method and a System for Outbound Content Security in Computer Networks ", Leonid Goldstein, Publication date: Aug. 23, 2007.

U.S. patent application Ser. No. 10/892615, "Method and Apparatus for Creating an Information Security Policy Based on a Pre-configured Template.", Chris Jones et. al., Publication date: Apr. 21, 2005.

U.S. patent application Ser. No. 11/485537, "Methods and System for Information Leak Prevention", Lidror Troyansky et al. Publication date: Feb. 1, 2007.

US Patent application number: PCT/US2006/005317, "Methods and Apparatus for Handling Messages containing Pre-selected data", Vontu Inc., Publication date: Aug. 24, 2006.

U.S. patent application Ser. No. 11/173941, "Message Profiling Systems and Methods", Paul Judge et. al., Publication date: Jan. 19, 2006.

U.S. patent application Ser. No. 11/284666, "Adaptive System for Content Monitoring", Ramanathan Jagadeesan et. al., Publication date: Jun. 7, 2007.

U.S. patent application Ser. No. 10/780252, "Method and Apparatus to detect Unauthorized Information Disclosure via Content Anomaly Detection", Pratyush Moghe, Publication date: Apr. 28, 2005.

"Behaviour based modeling and its application to Email analysis", Stolfo S J et al, ACM Transactions on Internet Technology, Volume 6, Number 2, May 2006. "Identifying Potential Suspects by Temporal Link Analysis", Gloor A Peter et. al, http://www.onixnet.com/iquest/whitepapers/linkanalysis.pdf Prior art considers the problem of information leakage as a content inspection and detection problem. These techniques look at the content of e-mails and try to determine if any sensitive information is being leaked out. Prior art also had looked at pattern anomaly detection, but that too was done from the content scanning perspective using pre-defined regular expressions or keywords, pre-determined policies, or information depending on the number and frequency of mails between senders and recipients. Thus, the outbound e-mail contents were read and information about these contents was then used to identify information leakage. For example, if the mail content contained specific keywords, a leakage was detected. Or, if some mails seemed to have certain words that are not usually the kind used by the sender, that mail will be flagged as an anomaly.

In some cases, both the sender and recipient information together with the time of sending and the frequency of mails were used, though the profile of the sender with respect to the organization (seniority, position, designation, age, salary etc.) were never used. These techniques are powerful and generic, but they need powerful hardware for scanning the documents and therefore can be a hindrance for many users. These processes also tend to be slow because of the processing involved. Also, scanning may not be to the liking of all users as it makes sensitive information open. Hence the need for a simpler technique that is faster, reliable and non intrusive i.e does not scan sensitive information.

SUMMARY OF INVENTION

This invention deals with an innovative system to detect information leakage in electronic mails without reading the content of the mail or attachments associated with the mails. Selection of the right set of input variables is one essential step of the invention. The second contribution of the invention is related to a scheme that can, detect information leakage by using the aforementioned set of mail variables without reading the mail content fully. Identification of proper input variables can be done using filtering techniques. The inputs are completely user-recipient pair independent, and they do not need any part of the content of either the e-mail or the attachment. This also enables the invention to detect information leakage when domain knowledge about the e-mails being sent is scanty, as the attributes are independent of the sender-recipient pairs and the content. Additionally, this invention does not require any sophisticated hardware to facilitate the analysis and content scanning of mails to keep up with the speed requirements that is demanded of such an application in real life scenarios.

In a first preferred embodiment the present invention provides a system to detect if an outbound e-mail sent by an employee of a plurality of employees of an enterprise is leaking critical information using a plurality of non-sensitive attributes with the aim of reducing false positives and false negatives, wherein said outbound email comprises of a header, a salutation, a body, a closing, and a plurality of attachments with each of said plurality of attachments comprising a file header and a file body, and said system comprises a means for obtaining a plurality of non-sensitive attributes based on a plurality of outbound emails of said enterprise, with each of said plurality of outbound emails comprises of a header, a salutation, a body, a closing, and a plurality of attachments with each of said plurality of attachments comprises a file header and a file body, without analyzing said body of each of said plurality of outbound emails and said file body of each of said plurality of attachments of each of said plurality of outbound emails; means for obtaining a plurality of employee-specific attributes based on said plurality of outbound emails and said plurality of employees; means for generating a plurality of models comprising: a neural network model, a support vector machine model, an employee-specific neural network model, an employee-specific support vector machine model, based on said outbound emails; and means for detecting leakage of critical information in said outbound email sent by said employee based on said plurality of models.

The means for obtaining the above mentioned plurality of non-sensitive attributes based said plurality of outbound emails, in another embodiment of the invention comprises a plurality of clean emails and a plurality of suspect emails, further comprises means for defining a plurality of possible attributes; means for extracting said plurality of possible attributes from each of said plurality of outbound emails; means for generating a plurality of cumulative fraction data plots based on each of said plurality of possible attributes for said plurality of outbound emails; means for generating a plurality of clean cumulative fraction data based on each of said plurality of possible attributes for said plurality of clean emails; means for generating a plurality of suspect cumulative fraction data based on each of said plurality of possible attributes for said plurality of suspect emails; means for generating a plurality of clean uniformity measures by applying a Kolmogorov-Smirnov test for uniformity on each of said plurality of clean cumulative fraction data; means for generating a plurality of suspect uniformity measures by applying a Kolmogorov-Smirnov test for uniformity on each of said plurality of suspect cumulative fraction data; and means for selecting an attribute of said plurality of attributes as part of said plurality of non-sensitive attributes if the associated clean uniformity measure of said plurality of clean uniformity measures is less than a pre-defined threshold and the associated suspect uniformity measure of said plurality of suspect uniformity measures is less than a pre-defined threshold.

In the system of present invention said plurality of possible attributes comprises: if the email is being sent to personal address or official address, if the email is being sent within office, if the email is being sent to a superior, whether the email is a new one or a forward or a reply or an autoreply, if the email contains a copy of forwarded email, if email contains non-empty body, if the email contains a non-empty body besides forwarded mail(s) if any, if mail contains a salutation, if the salutation is formal or informal, if email contains an ending, if the ending is formal or informal, if email contains attachment, if attachment is an office document or archive or text or image, if the email contains BCC, whether email contains BCC to only official address or only personal address or both, if the email contains CC, whether CC is only official or only personal or both, number of CC recipients, number of BCC recipients, if there is a CC to a superior or junior or both, mail body size, largest attachment size, if the largest attachment was sent out before, period of time elapsed after this attachment was sent last, if largest attachment was sent out before to a personal address or an official address, attachment name contains the word "vita" or "resume" or "CV", number of attachments in email, number of office attachments in email, number of image attachments in email, number of text attachments in email, number of other attachments in email, smallest attachment size, ratio of office document attachments to non-office document attachments in email, total attachment size, if email body size is bigger than total attachment size, number of forwarded mail bodies in email, if email was sent on a weekend or a weekday, whether email was sent in morning or afternoon or evening or night.

The means for obtaining said plurality of employee-non-sensitive attributes based said plurality of outbound emails comprising a plurality of clean emails and a plurality of suspect emails, further comprises means for defining a plurality of employee-specific possible attributes; means for extracting said plurality of employee-specific possible attributes based on sender of each of said plurality of outbound emails; means for generating a plurality of cumulative fraction data based on each of said plurality of employee-specific possible attributes for said plurality of outbound emails; means for generating a plurality of clean cumulative fraction data based on each of said plurality of employee-specific possible attributes for said plurality of clean emails; means for generating a plurality of suspect cumulative fraction data based on each of said plurality of employee-specific possible attributes for said plurality of suspect emails; means for generating a plurality of clean uniformity measures by applying a Kolmogorov Smirnov test for uniformity on each of said plurality of clean cumulative fraction data; means for generating a plurality of suspect uniformity measures by applying a Kolmogorov-Smirnov test for uniformity on each of said plurality of suspect cumulative fraction data; and means for selecting an attribute of said plurality of employee-specific possible attributes as part of said plurality of employee-specific attributes if the associated clean uniformity measure of said plurality of clean uniformity measures is less than a pre-defined threshold and the associated suspect uniformity measure of said plurality of suspect uniformity measures is less than a pre-defined threshold.

The plurality of employee-specific possible attributes comprises: age of Employee, Employee is a Senior Member, Employee is not a Senior Member, Employee Working for how many Years, Employee Working for how many years in said Enterprise, Employee changed Job earlier how many Times, Employee considered an Exceptional Performer, Employee considered as not an Exceptional Performer, Employee's Salary Revision Numbers, Employee's Salary Scale, Employee is given Special Benefits, Employee is not given Special Benefits, Employee ever showed previous Suspicious Behavior, Employee has not showed previous Suspicious Behavior, Employee has access to Confidential Information, Employee does not have access to Confidential Information, Employee has Rights to talk to every Department, Employee doesn't have Rights to talk to every Department, and Employee belongs to which Department.

The means for generating said plurality of models based on said plurality of outbound emails comprising a plurality of clean emails and a plurality of suspect emails, further comprises: means for generating said neural network model part of said plurality of models based on extracted said plurality of non-sensitive attributes from said clean emails and extracted said plurality of non-sensitive attributes from said plurality of suspect emails; means for generating said support vector machine model part of said plurality of models based on extracted said plurality of non-sensitive attributes from said clean emails and extracted said plurality of non-sensitive attributes from said plurality of suspect emails; means for generating said employee-specific neural network model part of said plurality of models based on said plurality of employee-specific attributes associated with a plurality of senders of said plurality of clean emails and said plurality of employee-specific attributes associated with a plurality of senders of said plurality of suspect emails; and means for generating said employee-specific support vector machine model part of said plurality of models based on said plurality of employee-specific attributes associated with a plurality of senders of said plurality of clean emails and said plurality of employee-specific attributes associated with a plurality of senders of said plurality of suspect emails.

The means for detecting leakage of critical information further comprises: means for extracting a plurality of non-sensitive attributes from said outbound email; means for extracting a plurality of employee-specific attributes associated with said employee; means for obtaining a neural network clean measure using said neural network model based on said plurality of non-sensitive attributes and said plurality of employee-specific attributes; means for obtaining a support vector machine clean measure using said support vector machine model based on said plurality of non-sensitive attributes and said plurality of employee-specific attributes; means for obtaining an employee-specific neural network clean measure using said employee-specific neural network model based on said plurality of non-sensitive attributes and said plurality of employee-specific attributes; means for obtaining an employee-specific support vector machine clean measure using said employee-specific support vector machine model based on said plurality of non-sensitive attributes and said plurality of employee-specific attributes; and means for categorizing said outbound email as clean email if combine measure based on said neural network clean measure, said support vector clean measure, said employee-specific neural network clean measure, and said employee-specific support vector machine measure is greater than a pre-defined threshold.

DETAILED DESCRIPTION

Figure 1:
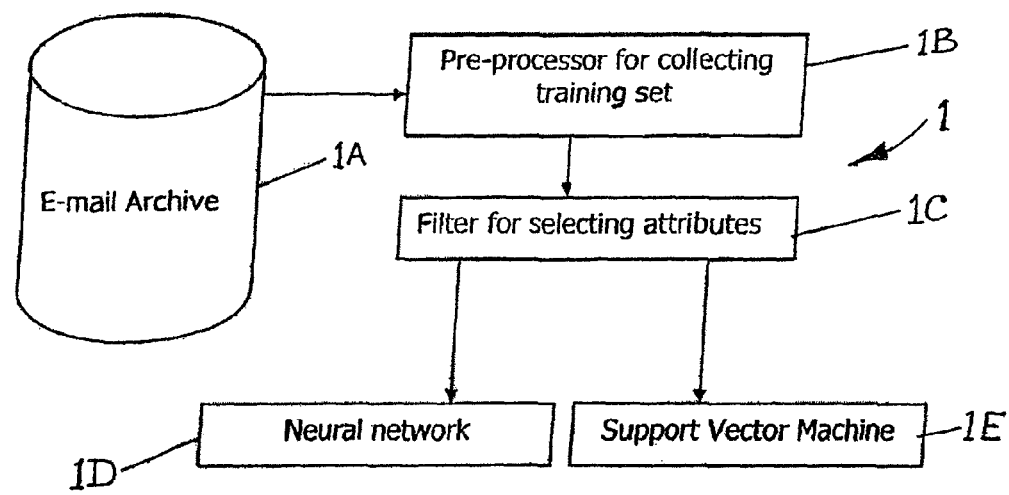
FIG. 1 is a block diagram of the system where attributes are extracted and the neural network and support vector machine are trained.
Figure 2:
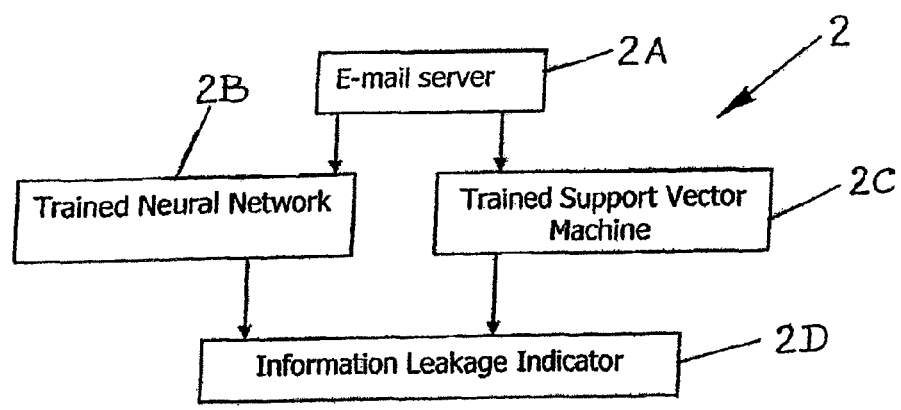
FIG. 2 is a block diagram of the system where the information leakage is detected.

Industrial espionage, stock market information leakage and sensitive news leaking out to the competition are all too common since time immemorial. With the advent of e-mails, this has become an even more pressing problem. Quite often, the mail volume from a company is huge, making manual monitoring impossible. Sometimes this information is so sensitive that even scanning the mails is not permitted.

The present invention is a system that is used to detect information leakage in e-mails, especially when full scanning of the e-mails is not permitted. Information leakage in e-mails primarily happens when sensitive documents are released to unauthorized parties via e-mail without prior consent of proper authority.

The present invention does not scan the entire body of the e-mail and creates a representation of some non-sensitive attributes from the email and some sender specific non-sensitive attributes. This is done using filtering. Once this is done, the representation is then used to detect potential information leakages.

The fundamentally new aspect of this invention is the following. All the existing techniques for detection of information leakage use the content of the matter being analyzed. The sequence followed by all such existing systems (see prior art citations) is as follows:

item 1: Get content of sensitive matter to be protected.
item 2: Analyze the content using pre-defined data and rules using exact match, relative positions, statistical and other techniques
item 3: Define attributes based on this analysis
item 4: Extract such attributes from content.
item 5: Use some system on these attributes to form a decision
Item 6: In real digital traffic situation, extract same attributes from flowing digital traffic and match with sensitive contents' attributes and arrive at a decision.

In the present invention, from the above list, items 2 and 3 can be removed. Thus, the content need not be made available to the system at all. Instead, a set of attributes which do not need the content of the matter are identified and extracted using filtering techniques. The list of attributes that is examined and analyzed by filtering techniques is given below a) If the email is being sent to personal address or official address
b) if the email is being sent within office
c) if the email is being sent to a person higher in the organizational hierarchy
d) whether the email is a new one or a forward or a reply or an autoreply
e) if the email contains a copy of forwarded email
f) if email contains non-empty body
g) if the email contains a non-empty body besides forwarded mail(s) if any
h) if mail contains a salutation
i) if the salutation is formal or informal
j) if the mail contains an ending
k) if the ending is formal or informal
l) if email contains attachment
m) if attachment is an office document or archive or text or image
n) if the email contains BCC
o) whether email contains BCC to only official address or only personal address or both
p) if the email contains CC
q) whether CC is only official or only personal or both
r) number of CC recipients
s) number of BCC recipients
t) if there is a CC to a superior or junior or both
u) mail body size
v) largest attachment size
w) if the largest attachment was sent out before
x) period of time elapsed after this attachment was sent last
y) if largest attachment was sent out before to a personal address or an official address
z) attachment name contains the word "vita" or "resume" or "CV"
aa) number of attachments in email
bb) number of office attachments in email
cc) number of image attachments in email dd) number of text attachments in email
ee) number of other attachments in email
ff) smallest attachment size
gg) ratio of office document attachments to non-office document attachments in email
hh) total attachment size
ii) if email body size is bigger than total attachment size
jj) number of forwarded mail bodies in email
kk) if email was sent on a weekend or a weekday
ll) Whether email was sent in morning or afternoon or evening or night.

In addition to that, a set of sender-specific non-sensitive attributes are also extracted. A list of those attributes is given below.

a) Age of Employee
b) Employee is a Senior Member
c) Employee is not a Senior Member
d) Employee Working for how many Years
e) Employee Working for how many years in said Enterprise
f) Employee changed Job earlier how many Times
g) Employee considered an Exceptional Performer
h) Employee considered as not an Exceptional Performer
i) Employee's Salary Revision Numbers
i) Employee's Salary Scale
k) Employee is given Special Benefits
l) Employee is not given Special Benefits
m) Employee ever showed previous Suspicious Behavior
n) Employee has not showed previous Suspicious Behavior
o) Employee has access to Confidential Information
p) Employee does not have access to Confidential Information
q) Employee has Rights to talk to every Department
r) Employee doesn't have Rights to talk to every Department
s) Employee belongs to which Department.

This selection is done off-line on an archive. Any third party tool can then be used outside the system to extract those attributes beforehand and fed to the system. No analysis of the content is needed. This way, we suggest a completely novel approach to the problem, without analyzing the content but defining sender behavior related attributes.

Furthermore, this system reduces the demand for sophisticated hardware. For any system requiring analysis of content and sender-recipient pairs, a fast hardware is needed to be able to scan the mail fast in real time. With the proposed system, the attributes can be extracted by simple means (as this does not need any deep scan) without any elaborate packet reconstruction, policy or keywords list.

We will describe the outbound e-mail information leakage detection system in steps.

Figure 3:
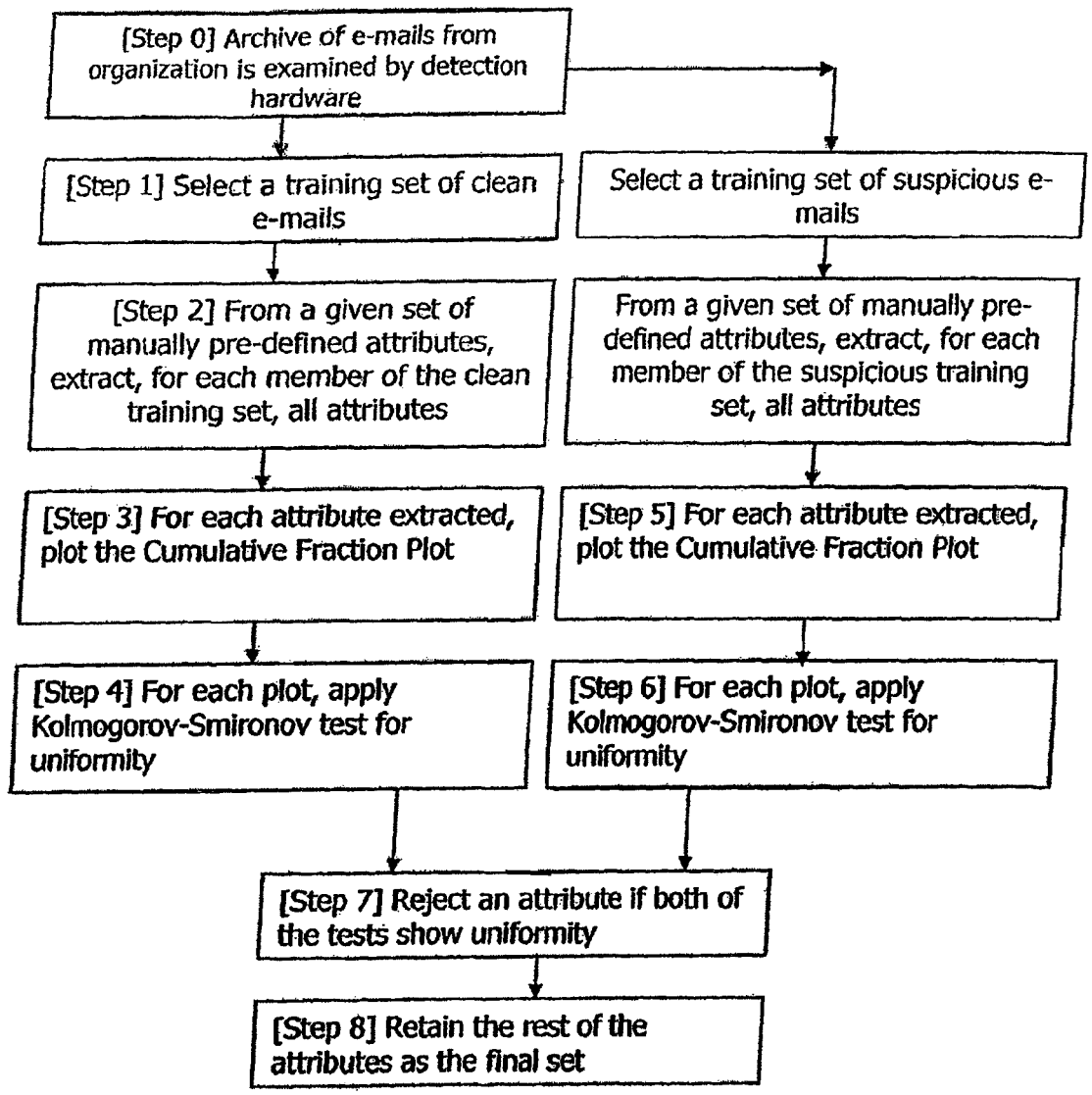
FIG. 3 is a flow diagram which shows the extraction of attributes from archive of e-mails using filtering.
Figure 3A:
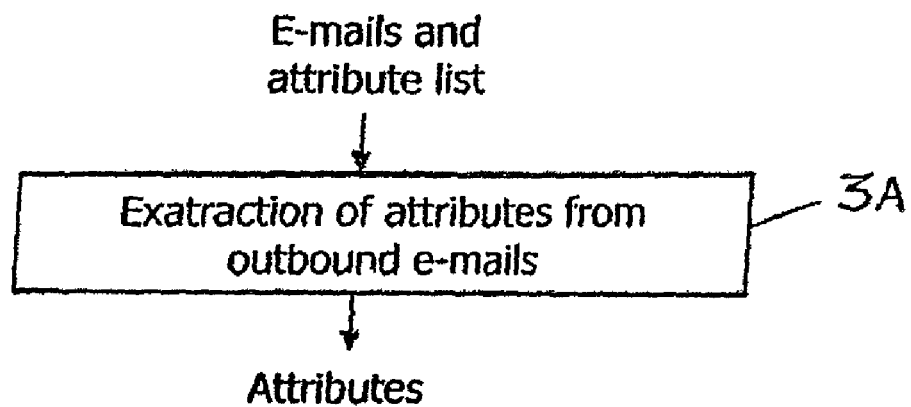
Figure 3B:
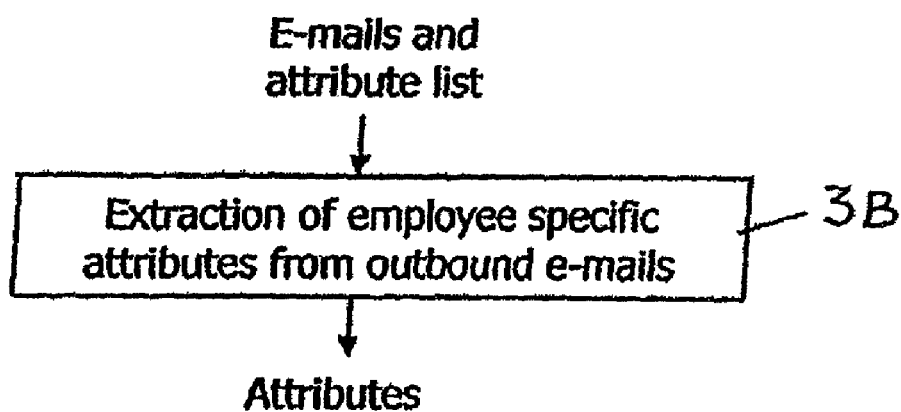

The first eight steps of the process are illustrated in FIG. 3. These are described below.

Step 0: First, the analysis unit looks at an archive of e-mails.
Step 1: A set of mails from the archive is selected as clean, that is, containing no violation. This set is determined by manual inspection. Yet another set of mails from the archive is selected as suspicious, that is, containing violations. This set is determined by manual inspection. Together, these two sets form the training set.
Step 2: For each mail in the training set, a plurality of non-sensitive attributes and a plurality of employee profile related attributes are extracted and stored.
Step 3: For each attribute extracted, determine a cumulative fraction data of the clean mails. This determines the fraction of mails occurring under a value of the attribute against the attribute values.
Step 4: For each of the above, apply a Kolmogorov-Smironov test for uniformity. This test compares a test data set with a benchmark data set that is uniformly distributed and returns a belief value. See "*Statistical Methods in Experimental Physics*" by Eadie W T, Drijard F E, James F E, Roos M and Sadoulet B for a discussion on this test and some applications.
Step 5: For each attribute extracted, determine a cumulative fraction data of the suspicious mails.
Step 6: For each of the above, apply a Kolmogorov-Smironov test for uniformity.
Step 7: If both of step 4 and step 6 show uniformity reject that attribute.
Step 8: Retain and store other attributes as the final set.

Figure 4:
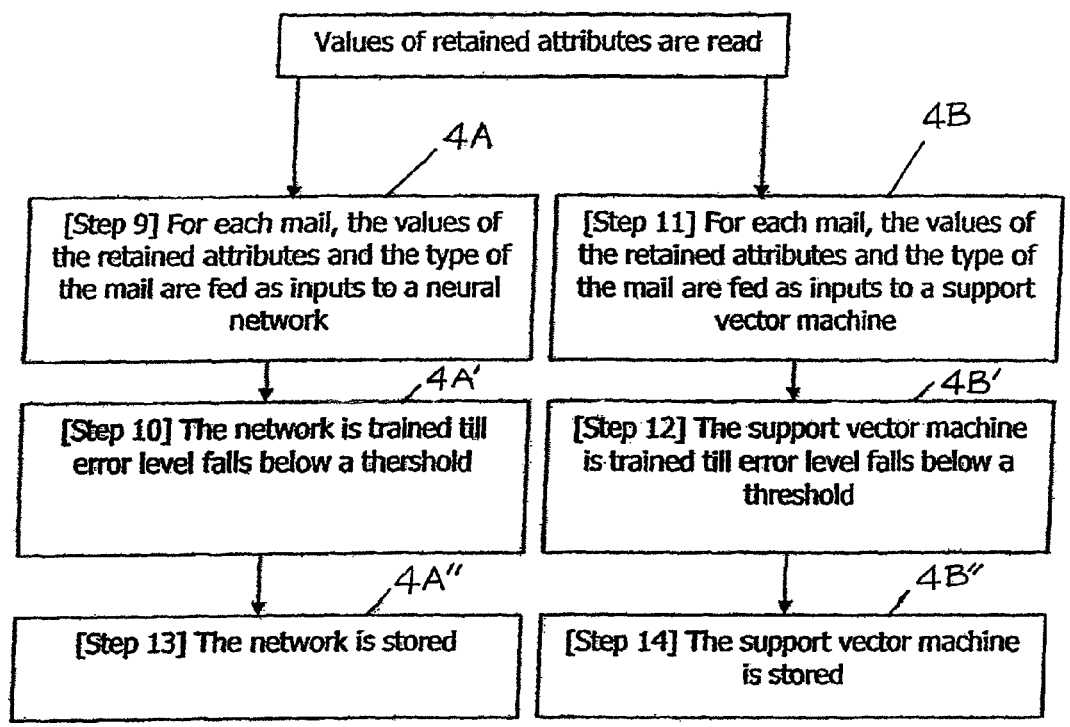
FIG. 4 is a flow diagram to show the steps involved in training the neural network and support vector machine.

Once the said attributes from the said training set are extracted and stored, a neural network and a support vector machine are run on this set of attributes. This is called the training phase. FIG. 4 shows the next six steps involved which are described below.

Step 9: The retained attributes' values for each mail are fed as inputs to a neural network, along with the type of the mail, clean or suspicious,
Step 10: The network is trained till the error level fall below a pre-defined threshold.
Step 11: The retained attributes' values for each mail are fed as inputs to a support vector machine, along with the type of the mail, clean or suspicious
Step 12: The support vector machine is trained till the error level fall below a pre-defined threshold.
Step 13: The neural network thus obtained from step 11 is stored.
Step 14: The support vector machine thus obtained from step 12 is stored.

Figure 5:
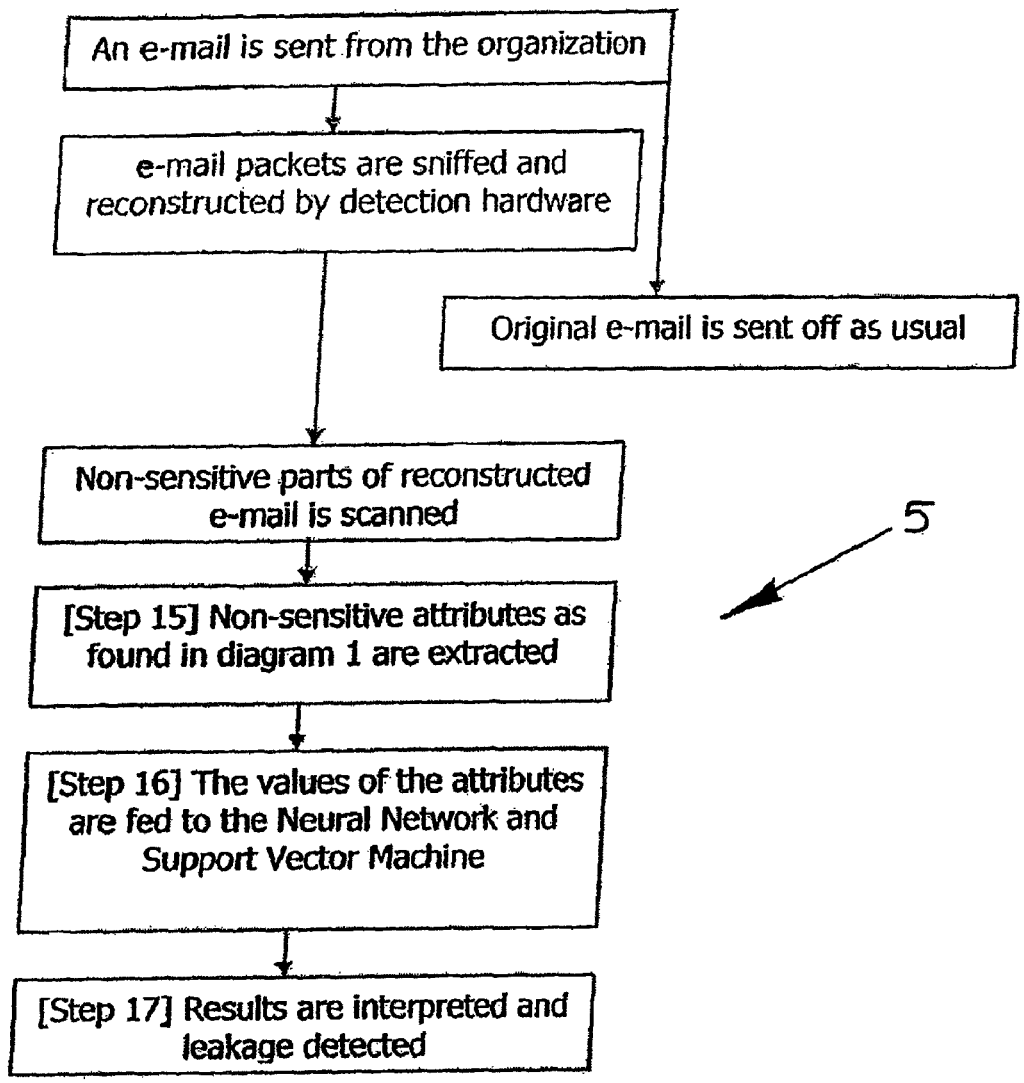
FIG. 5 is a flow diagram to show the steps involved in detection of information leakage in e-mails using neural network and support vector machine on attributes extracted.
Figure 6:
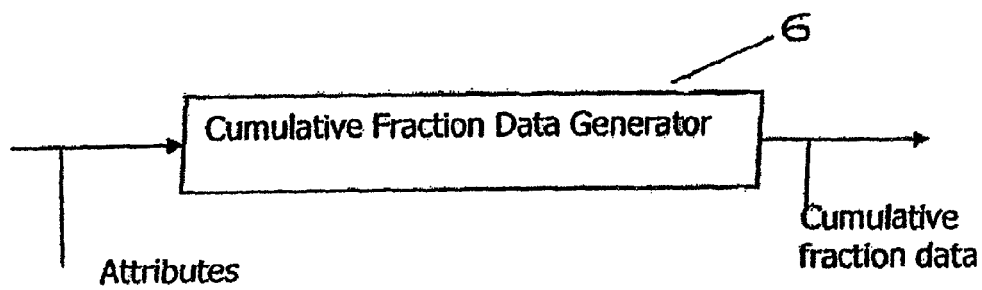
FIG. 6 is a block diagram of the system that generates cumulative fraction data from attributes.
Figure 7:
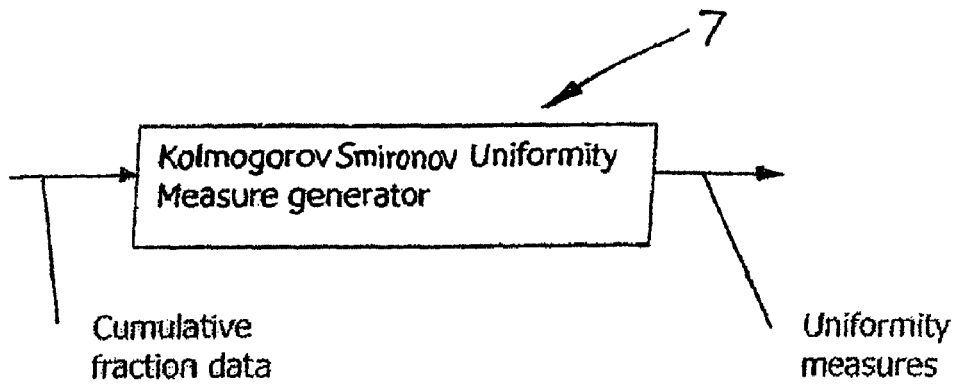
FIG. 7 is a block diagram of the system that generates Kolmogorov-Smirnov unformity measures from cumulative fraction data.
Figure 8:
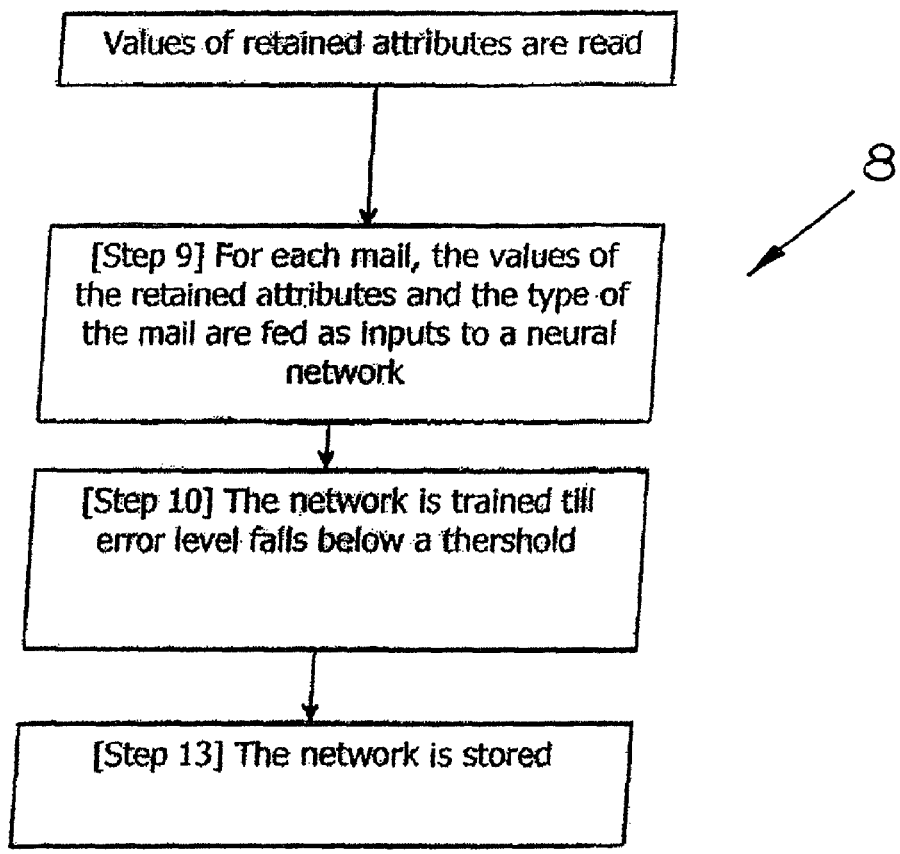
FIG. 8 is a block diagram of the system that generates a neural network given the attribute values.
Figure 9:
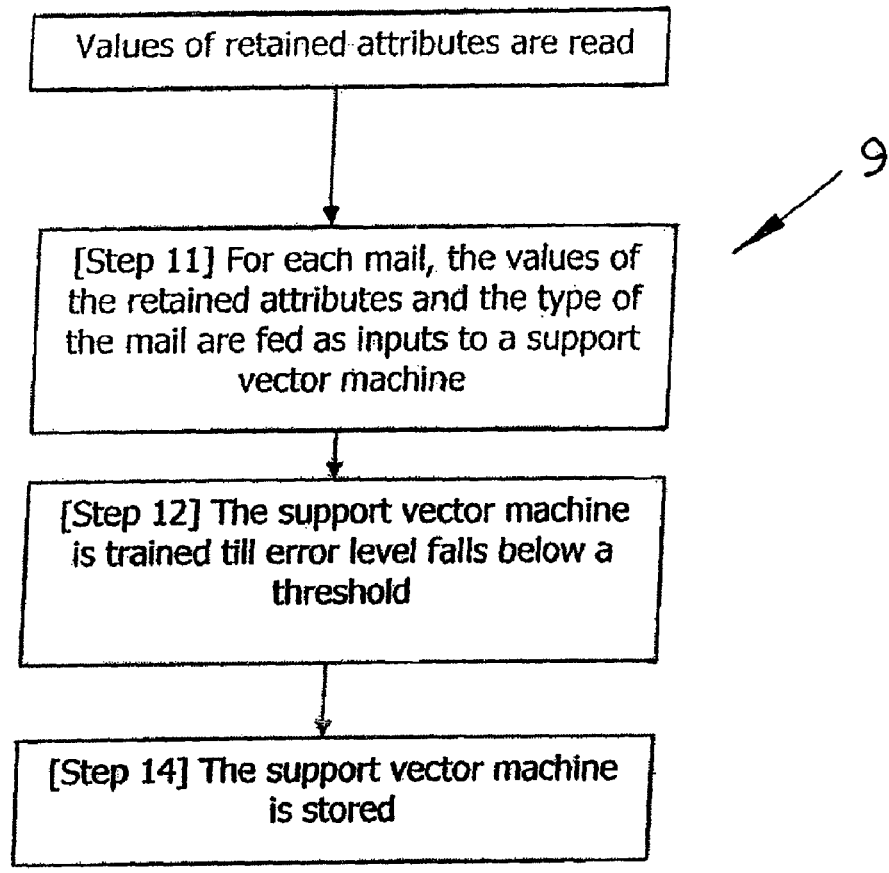
FIG. 9 is a block diagram of the system that generates a support vector machine given the attribute values.
Figure 10:
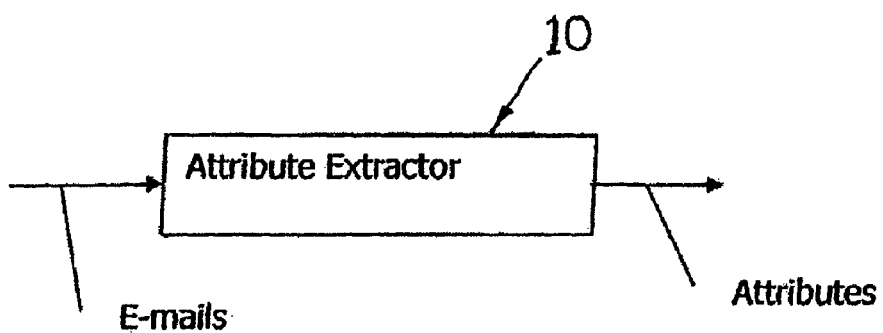
FIG. 10 is a block diagram of the system that extracts the attributes from e-mails.
Figure 11:
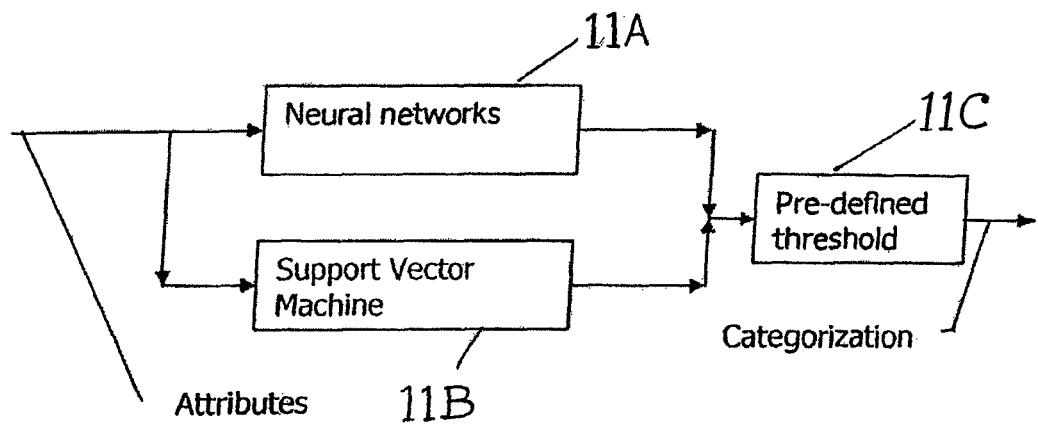
FIG. 11 is a block diagram of the system that categorizes e-mails based on the attribute values using a neural network/support vector machine.
Figure 12:
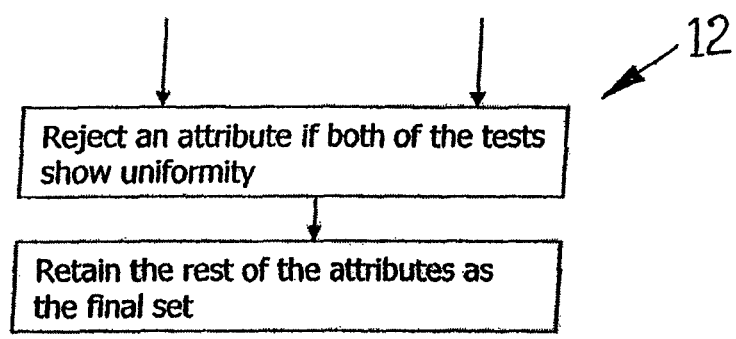
FIG. 12 shows rejection and retention of attributes based on uniformity values.

The aforementioned stored neural network and support vector machine are now used for detecting any suspicious outgoing e-mail. The steps are as follows, shown in FIG. 5.

Step 15: For every new mail, the said set of attributes as obtained in step 8 are extracted.
Step 16: The attribute values as obtained in step 15 are fed as inputs to the neural network stored in step 13 and to the support vector machine stored in step 14.
Step 17: The neural network and support vector machine's outputs are checked and a classification is given to the mail (clean or suspicious, respectively) if the said output crosses a pre-defined threshold or falls below a pre-defined threshold, respectively.

What is claimed is:

1. A system to detect if an outbound e-mail of a plurality of outbound e-mails sent by an employee of a plurality of employees of an enterprise is leaking critical information using a plurality of non-sensitive attributes and a plurality of employee-specific models with the aim of reducing false positives and false negatives said system is adapted to execute a method comprising of:

determining of said plurality of non-sensitive attributes based on a plurality of possible attributes associated with said plurality of outbound e-mails;
obtaining of said plurality of employee-specific attributes based on said plurality of employees and said plurality of outbound e-mails; and
determining of said plurality of employee-specific models based on said plurality of employee-specific attributes,
wherein, determining of said plurality of non-sensitive attributes comprises:
obtaining of a plurality of clean e-mails based on said plurality of outbound e-mails;

obtaining of a plurality of suspect e-mails based on said plurality of outbound e-mails;

extracting of said plurality of possible attributes based on said plurality of outbound e-mails;

generating of a plurality of cumulative fraction data plots based on each of said plurality of possible attributes;

determining of a plurality of clean cumulative fraction data points based on said plurality of cumulative fraction data plots and said plurality of clean e-mails;

determining of a plurality of suspect cumulative fraction data points based on said plurality of cumulative fraction data plots and said plurality of suspect e-mails;

generating of a plurality of clean uniformity measures by applying a Kolmogorov-Smirnov test for uniformity on said plurality of clean cumulative fraction data points;

generating of a plurality of suspect uniformity measures by applying a Kolmogorov-Smirnov test for uniformity on said plurality of suspect cumulative fraction data points;

selecting an attribute of said plurality of possible attributes if a clean uniformity measure of said plurality of clean uniformity measures associated with said attribute is less than a pre-defined threshold and a suspect uniformity measure of said plurality of suspect uniformity measures associated with said attribute is less than a pre-defined threshold; and making of said attribute a part of said plurality of non-sensitive attributes.

2. The system of claim 1, wherein said plurality of employee-specific attributes comprises at least one of:

age of Employee, Employee is a Senior Member, Employee is not a Senior Member, Employee Working for how many Years, Employee Working for how many years in said Enterprise, Employee changed Job earlier how many Times, Employee considered an Exceptional Performer, Employee considered as not an Exceptional Performer, Employee's Salary Revision Numbers, Employee's Salary Scale, Employee is given Special Benefits, Employee is not given Special Benefits, Employee ever showed previous Suspicious Behavior, Employee has not showed previous Suspicious Behavior, Employee has access to Confidential Information, Employee does not have access to Confidential Information, Employee has Rights to talk to every Department, Employee doesn't have Rights to talk to every Department, and Employee belongs to which Department.

3. The system of claim 1, wherein said determining of said plurality of employee-specific models comprises:

generating of an employee-specific neural network model based on said plurality of employee-specific attributes, wherein said employee-specific neural network model is a part of said plurality of models; and generating of an employee-specific support vector machine model based on said plurality of employee-specific attributes, wherein said employee-specific support vector machine model is a part of said plurality of models.

* * * * *